(No Model.)  H. M. & J. S. PIERSON.  5 Sheets—Sheet 1.
PROCESS OF AND APPARATUS FOR MANUFACTURING GAS.
No. 269,162.  Patented Dec. 12, 1882.
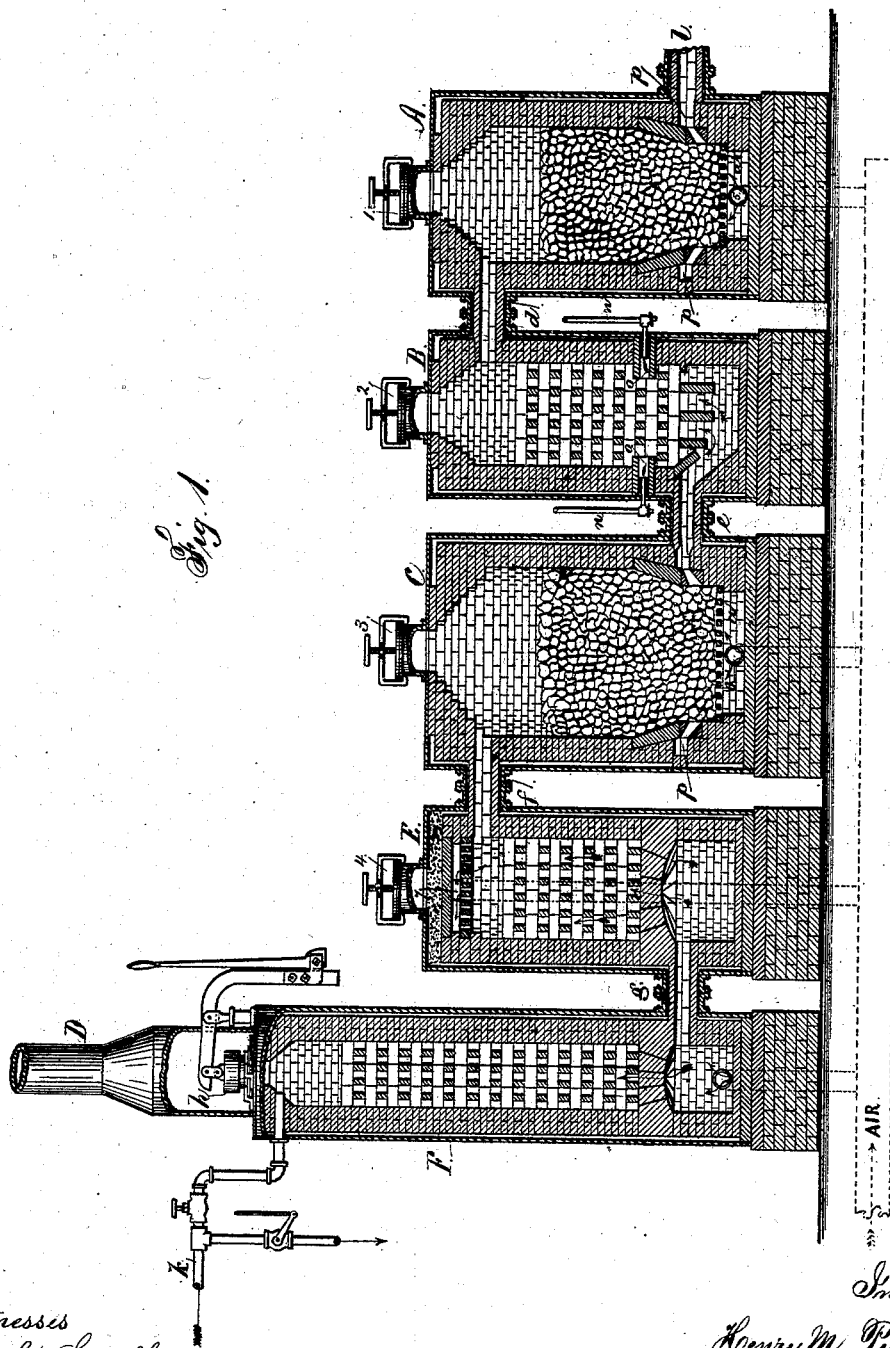

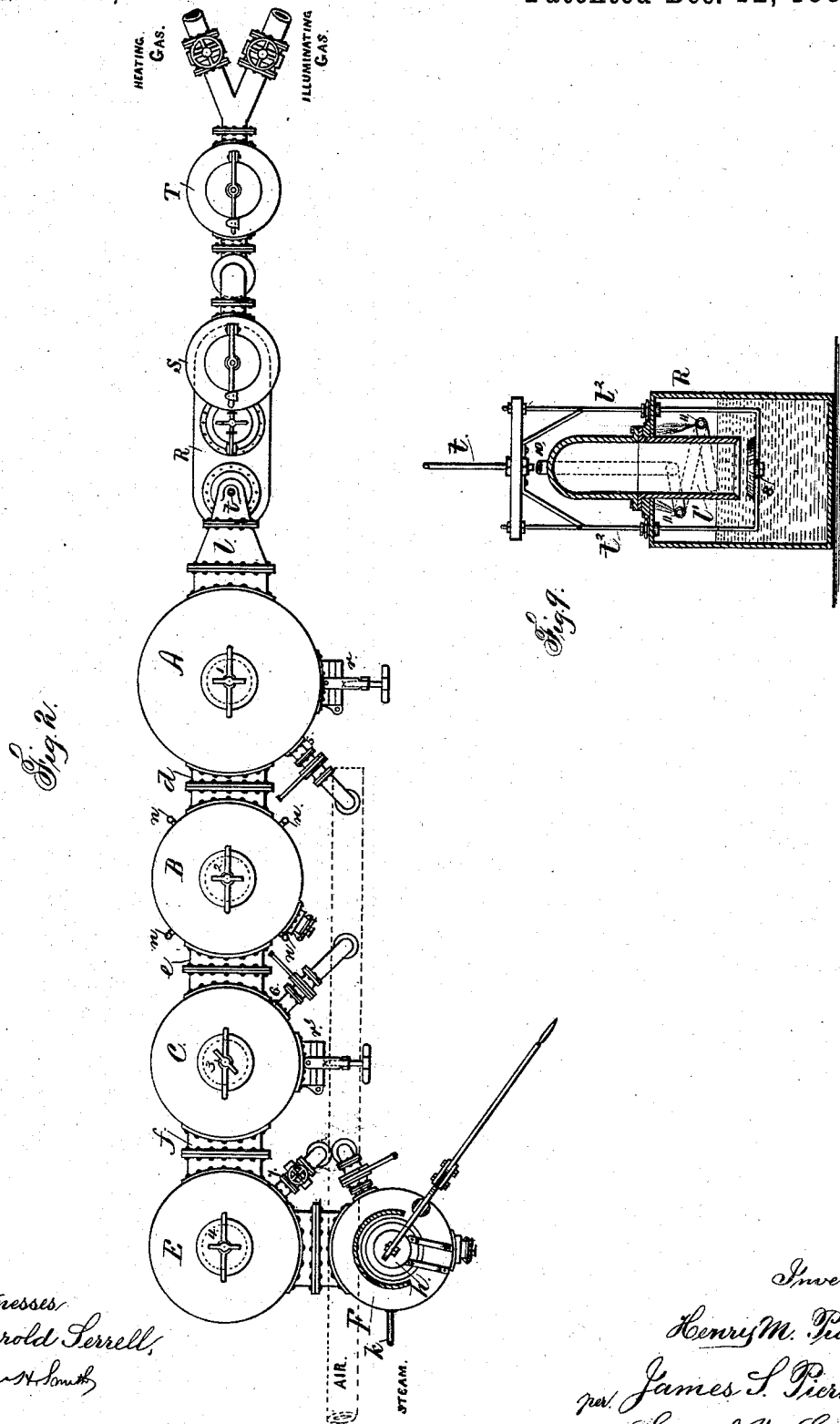

(No Model.)
H. M. & J. S. PIERSON.
PROCESS OF AND APPARATUS FOR MANUFACTURING GAS.
No. 269,162.    Patented Dec. 12, 1882.
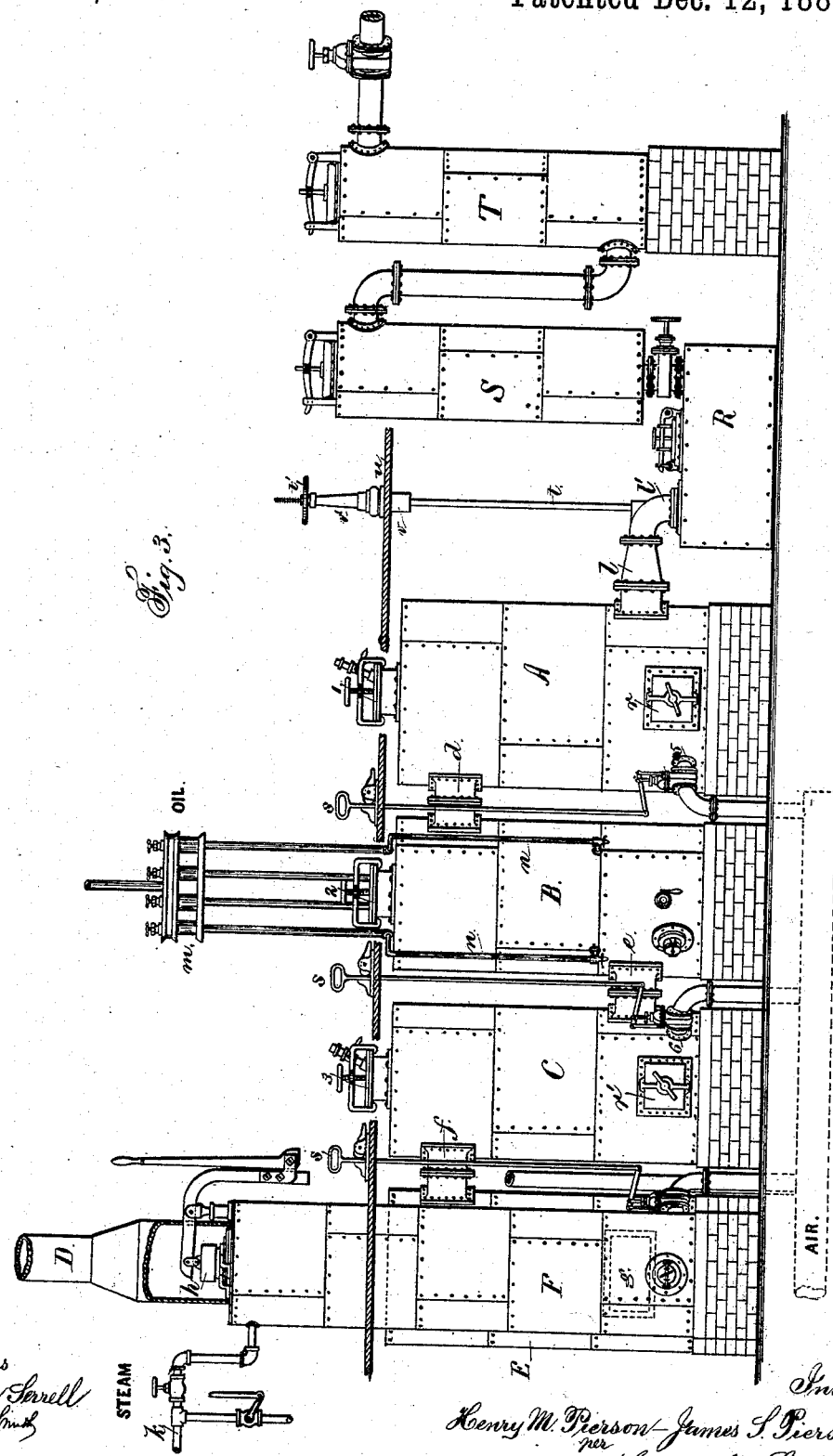

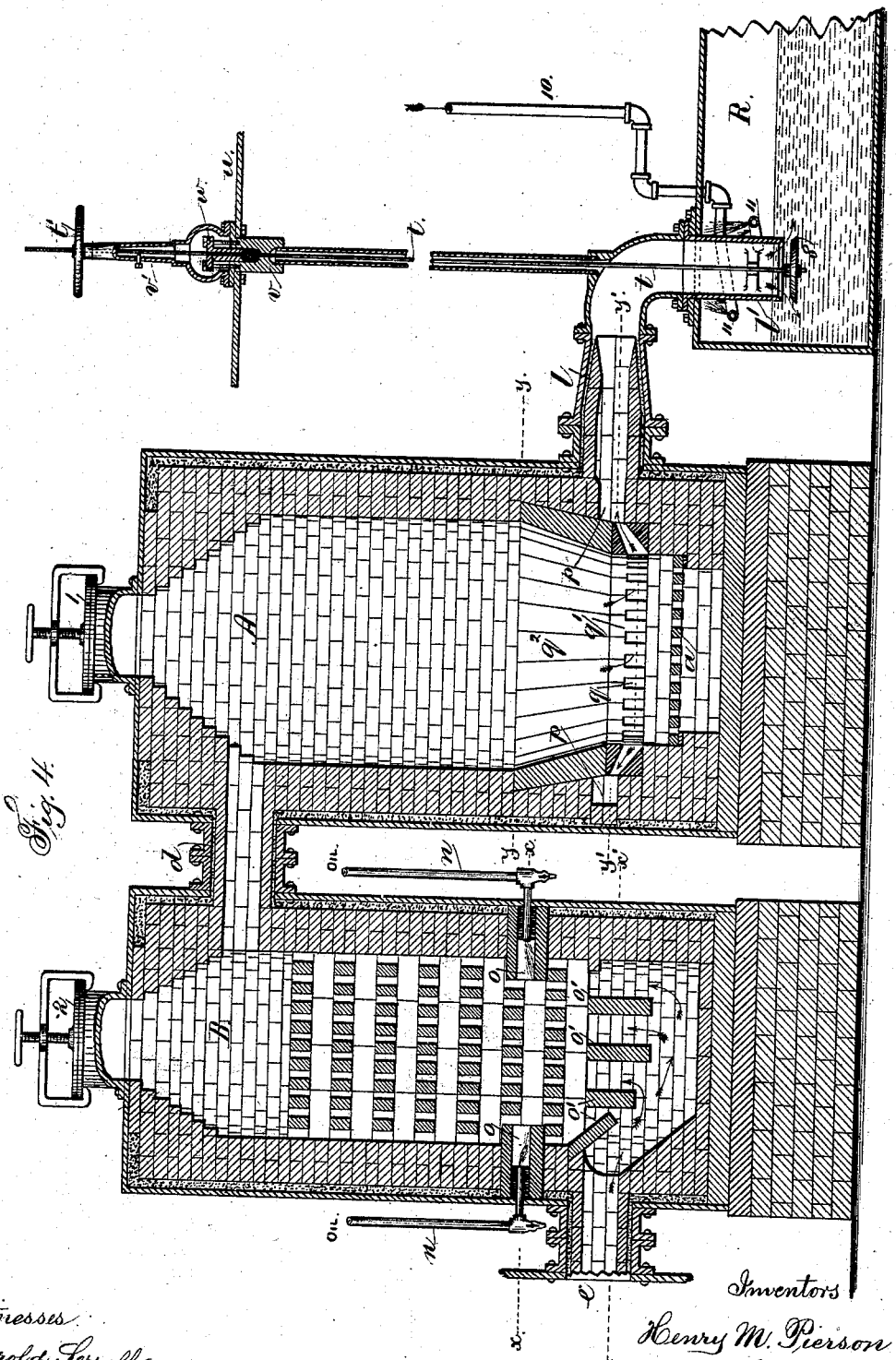

(No Model.) 5 Sheets—Sheet 5.
H. M. & J. S. PIERSON.
PROCESS OF AND APPARATUS FOR MANUFACTURING GAS.
No. 269,162. Patented Dec. 12, 1882.
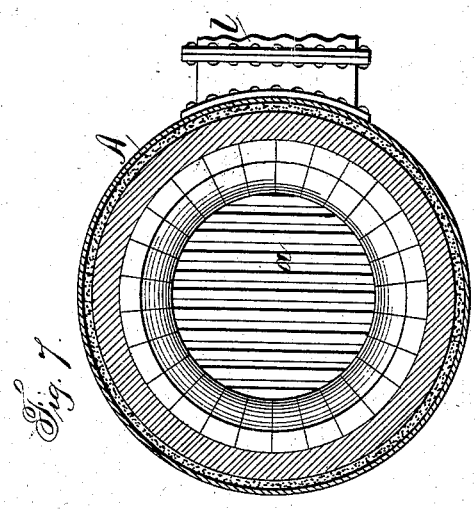
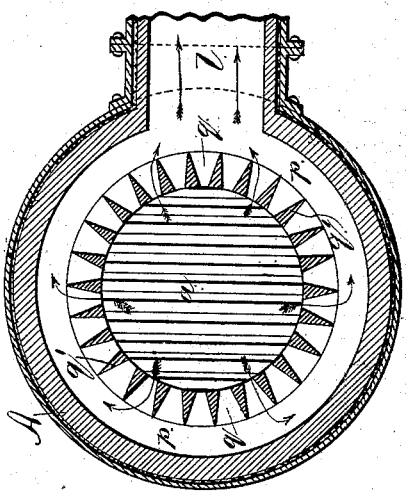
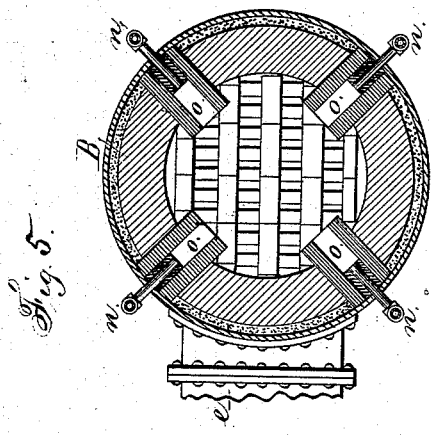
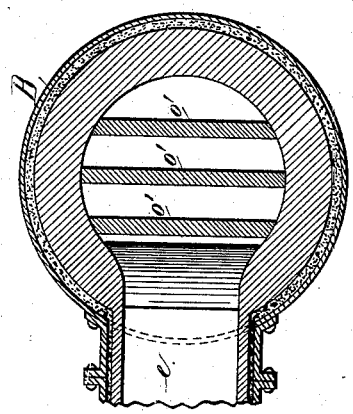
Witnesses
Harold Serrell
Chas. H. Smith
Inventors
Henry M. Pierson
James S. Pierson
per Lemuel W. Serrell
Atty

UNITED STATES PATENT OFFICE.

HENRY M. PIERSON, OF BROOKLYN, NEW YORK, AND JAMES S. PIERSON, OF PLAINFIELD, NEW JERSEY.

PROCESS OF AND APPARATUS FOR MANUFACTURING GAS.

SPECIFICATION forming part of Letters Patent No. 269,162, dated December 12, 1882.

Application filed June 28, 1882. (No model.)

*To all whom it may concern:*

Be it known that we, HENRY M. PIERSON, of Brooklyn, in the county of Kings and State of New York, and JAMES S. PIERSON, of Plainfield, in the county of Union and State of New Jersey, have invented an Improvement in Process of and Apparatus for Manufacturing Gas, of which the following is a specification.

Non-luminous gas has been made by passing steam down through a bed of incandescent fuel, and in some instances non-luminous gas has been formed by passing steam up through a bed of incandescent fuel and commingling with the resulting products of its decomposition carbonaceous material, and then passing such commingled products and materials down through a bed of incandescent fuel.

In the methods heretofore devised certain difficulties have been experienced that it is the object of the present invention to overcome. In these pre-existing devices there is always considerable residuum or waste products condensed or detained in the washer or scrubber. In considering this matter we were unable to discover any necessity for any such waste products, and, knowing very well that these greatly enhanced the cost of production of illuminating-gas, we turned our attention to discovering the cause and applying the remedy, and as a result have produced an apparatus capable of producing either luminous or non-luminous gas of any desired quality with scarcely any appreciable residuum, and requiring but little attention, and obtaining a quality of gas that has never been surpassed.

Being aware of most of the devices that had heretofore been employed in this country, both in the manufacture of luminous and non-luminous gas, and of the Letters Patent No. 266,397, granted April 13, 1880, to M. S. Frost, we have combined with the apparatus therein shown certain improvements for accomplishing the before-named objects.

In the drawings we have represented the apparatus employed by us with the most approved appliances; but as this invention is not necessarily dependent upon the details of construction, we will first describe the general character of the apparatus and its mode of operation, and then specify the details of construction which we find it advantageous to employ.

Figure 1 is a general sectional view illustrative of the invention in question. Fig. 2 is a plan view of the apparatus as we have found it desirable to arrange it. Fig. 3 is an elevation of said apparatus. Fig. 4 is a vertical section of the generator and the commingling-chamber. Fig. 5 is a plan below $x\,x$. Fig. 6 is a plan below $x'\,x'$. Fig. 7 is a plan below $y\,y$. Fig. 8 is a plan below $y'\,y'$, and Fig. 9 shows a modification spoken of hereinafter.

A represents a retort, preferably vertical, containing fuel—such as anthracite coal, coke, charcoal or similar material—supported upon a grate, $a$. This we term the "generator." B represents a retort, preferably vertical and lined with bricks, and containing bricks or pieces of refractory substances to become heated. This we term the "commingler." C represents another retort, similar generally to the retort A, but preferably larger, as seen in Fig. 1. This we term the "decomposer." E is a retort similar generally to the retort B, and which we term the "superheater;" and usually it is preferable to have two of these. We have shown a second superheater, F. These retorts are connected to each other at alternate opposite ends—the top of A and B by a throat, $d$, the bottom of B and C by a throat, $e$, the top of C and E by the throat $f$, the bottom of E and F by the throat $g$. There is a chimney, D, above F, and a tight-fitting damper, $h$, which, by preference, is similar to that shown in Letters Patent No. 252,967. There is a pipe, $k$, leading from a suitable steam-boiler, and a cock to regulate the supply of steam into F, and $l$ is a pipe conveying away the gas to any suitable holder. Each retort has a movable cover to give access to the interior. The covers are of any desired character and fitted gas-tight. They are numbered 1 2 3 4.

At 5 and 6 there are openings below the grate-bars of the respective retorts A and C, with pipes and cocks for admitting atmospheric air when required. There is also a valve at 8 to close the gas-discharge pipe $l'$.

We now presume that the damper 8 is closed, that the covers 1 and 3 have been removed, and that a sufficient quantity of fuel has been placed in the generator A and decomposer C, according to the quality of the coal and the character of the gas which it is desired to produce. The covers are now tightly secured, and the mass in the generator A is ignited, the products of combustion passing by $d$, B, $e$, C, $f$, E, $g$, and F to the chimney D, the damper $h$ being open. During this operation air (preferably from a blower) is admitted at 5, 6, and 7, and combustion is continued until the fuel in the decomposer C is of a red heat or incandescent. The retorts are to be heated in a similar manner from time to time, the gas-making being suspended during the time that the heat is being augmented by the admission of atmospheric air to the fuel and the flow of the ignited gases toward the chimney in the manner just described, and fuel is to be added to the decomposer and generator from time to time, as required, and there should be sight-holes with glass, protected by cocks, as shown in said Patent No. 252,967, to each of the retorts, whereby to observe their temperature.

Under all the circumstances attendant upon the heating up of the apparatus the following are the general conditions of the mode of operation: The fuel in the generator A is consumed, and the escape-gases are carbonic oxide and carbonic acid. These pass through the commingler B and heat the same. This soon rises to the temperature of the gases. The gases burn by contact with the air in the decomposer, and the heat is thereby intensified, and the fuel in C is heated by the escape products from A and brought up to the proper condition of a low incandescence, and but very little of the carbon in the decomposer is consumed in this operation. The gases that pass off by $f$ are almost entirely carbonic oxide in consequence of the low temperature. These are burned in the superheaters E F, and these superheaters are raised to a high temperature, especially the superheater E. The operation, however, is conducted with reference to the economizing of heat and the loss of but little up the chimney D. As soon as the necessary heat has been obtained the damper $h$ is tightly closed, and all the air-inlets also closed tightly, and steam admitted at $k$. This passes through the superheaters and takes up from time to time sufficient heat to prepare it for decomposition in passing through the bed of low incandescent fuel in C. The oxygen of the steam combines with the carbon, and the hydrogen and carbonic oxide and carbonic acid pass down through the decomposer, through $e$, up through the commingler B, where their heat is maintained, and then these gases pass down through the highly-incandescent fuel in the generator A and escape by the pipe $l$ to the gas-holder. This is the operation in making non-luminous gas, and the result is almost a pure carbonic oxide and free hydrogen or heating gas, because the gases as they pass down through the generator are exposed to an increasing temperature in the presence of carbon and with no opportunity to obtain any more oxygen. Hence the carbonic acid is deprived of an equivalent of its oxygen reconverted into carbonic oxide, and the element of oxygen combines with more carbon, and the escaping gases are nearly pure carbonic oxide and free hydrogen, and there is no unnecessary loss of fuel or heat in the operation.

We will now describe the operations performed in the manufacture of illuminating-gas. There is no change in the retorts or the mode in which they are heated from time to time. We simply supply petroleum or other liquid hydrocarbon into the commingler B. This is effected by one or more pipes, $n$, through which the proper supply is admitted, and it flows into the commingler B, and is simply vaporized and commingles with the non-luminous gases passing through it from the decomposer C. The heat in this commingler never reaches the decomposing-point; therefore lamp-black or tarry matter will never be formed from the petroleum or other hydrocarbon. When the gases and the hydrocarbon vapors come in contact with the incandescent fuel in the generator a double decomposition and recomposition takes place. The gases that would be non-luminous if the hydrocarbon vapors were absent are produced without carbonic acid, or nearly so, as aforesaid, and the carbonic oxide, hydrogen, and the hydrocarbon vapors commingle, and are formed into a fixed illuminating-gas, and if there are any watery matters present or uncombined vapors, the carbon in the generator A combines therewith, forming carbonic oxide and free hydrogen.

We remark that in making non-luminous gas it is preferable to employ a deeper bed of coal in the generator A than when illuminating-gas is being made.

It will be seen from the foregoing description that the bed of incandescent fuel remains for a considerable time at the required temperature, and there is very little demand upon the heat in this generator, because all the gases and vapors reach the same at about the gas-making temperature, and the generator-fire has simply to recombine and fix these gases. Hence there is nothing to condense or remove from the gas that is manufactured, and there being little or no carbonic acid in the gas, there is nothing to interfere with a perfect combustion, and the materials that have heretofore passed off as carbonic acid are utilized and rendered an active element of combustion in the form of carbonic oxide. At the same time the volume of gas produced is proportionately increased. The gases passing away from the apparatus by the pipe $l$, hence, are free, or nearly so, from injurious gases or foreign or uncombined substances, and the waste products from other modes of manufacture are almost entirely prevented, and the gas can be furnished at a corresponding reduction in cost.

It is to be understood that one or more testburners are kept in operation, so that the attendant can observe the quality of gas passing away in the main $l$ and regulate the supply of steam and of hydrocarbon liquid according to the light-giving power required; and when non-luminous gas for heating purposes is required the supply of liquid hydrocarbon is stopped. The oil or liquid hydrocarbon is preferably supplied through glass tubes $m$ and the accompanying regulating-cocks—such as shown in Letters Patent No. 252,967—and we prefer to employ arched tubes of fire-brick, as at $o$, that pass into the commingler, as seen in Figs. 1 and 4, and receive into them the iron pipes $n$, that convey the oil, and these are plastered into the tubes $o$ with fire-clay, so as to be perfectly tight. The deflecting-slabs $o'$ at the lower part of the commingler cause the gases to spread evenly in passing up through the said commingler.

The retorts are preferably of fire-brick within a wrought-iron casing, with intermediate packing of clay or ashes in a thin stratum, as shown.

In order to give a free vent to the escaping gases, and to prevent ashes being carried along with the gases, we form an annular space, $p$, around the fire-chamber in the generator A and decomposer C, and introduce bricks $q'$, with channels between them, as at $q$, the channels sloping upwardly, so as not to be obstructed by the fuel, and to give a free vent for the gases. The bricks $q'$ $q'$ are segments of cylinders, so as to set together accurately around the generator or decomposer and form a portion of the lining of the same. The channels $q$ are preferably half in one of the bricks and the other half in the next brick, and these passageways widen toward the annular space $p$, so that the intermediate portion of the brick is wedge-shaped, as seen in Fig. 8. The bricks $q^2$, above the bricks $q'$, are segmental, and form a tapering waist to the generator or decomposer, as shown.

There are air-tight doors $r$ $r'$ at the respective ash-pits, so that the ashes can be removed whenever necessary.

It is preferable to employ handles $s$ to the valves of the air-pipes, the said handles extending to a platform over the retorts, so that the attendants can operate all the parts from above.

The gas-pipe $l$ is represented as passing to the washer R, in which the gas is cooled, and should there be any foreign substance it will be removed, in the usual manner, by passing through the scrubbers S and T.

Difficulty has been experienced in keeping the packing for the valve-rod $t$ tight on account of the heat of the escaping gas. To obviate this difficulty I extend such rod up above the platform $u$ and inclose it with a tube, $v$, and standard $v'$, and place the packing-gland $w$ at the upper end of such tube $v$, as seen in Fig. 4. The valve 8 closes upwardly against the lower end of the tube $l'$, and there is a hand-wheel, $t'$, and screw-thread on the rod $t$, by means of which the valve is opened and closed.

Difficulty has been experienced by the valve-rod $t$ occasionally melting off inside the tube $l'$, and to overcome this we sometimes provide a device, as shown in Fig. 9, wherein there are two rods, $t^2$, passing at each side of the tube $l'$ through stuffing-boxes in the top of the washer R. These rods $t^2$ are united and pass across the mouth of the tube $l'$ and carry the valve 8, and at their upper end there is a yoke or cross-head, to which the rod $t$ is fastened and passes to the standard $v'$ and wheel $t'$, as shown in Fig. 4.

In Fig 4 I have shown a descending pipe, 10, as entering the washer, and having its end, at 11, bent in a spiral form and encircling the tube $l'$, and its extreme end closed. The upper surface of this pipe 11 is perforated in any desired manner, and the water descending the pipes 10 and 11 is ejected in a spray through these perforations in an upward direction against the tube $l'$ and the joint upon the washer-casing. This is done to keep the parts cool and prevent the hot gas from injuring the joints of the pipes or the valve or valve-seat.

We find that when steam or gases are passed in at the bottom of a bed of incandescent fuel a very different operation takes place from that which results from passing the gases downwardly. In the first instance the hot gases leave the cooler portion of the fuel where there is an excess of carbon. In the latter case they leave where there is the most heat and earthy matter in the form of ashes. Consequently the gases retain their heat, and are not altered in their condition by the presence of a mass of unconsumed carbonaceous matter. When steam enters a bed of incandescent fuel the same is decomposed and the oxygen and carbon first combine as carbonic acid. To convert this into carbonic oxide requires an additional equivalent of carbon. This is effected most perfectly by passing the gases down through the fire, because the heat is greatest and the union becomes the most perfect.

We are aware that heated steam has been passed down through one bed of incandescent fuel; but we find that the carbonic acid is more fully converted into carbonic oxide by passing the gases down through the second bed of incandescent fuel.

We claim as our invention—

1. The method herein specified of making non-luminous gas, consisting in superheating steam by passing it through a superheater, then decomposing the steam into hydrogen, carbonic acid, and carbonic oxide by passing it down through a bed of incandescent fuel, and finally converting the carbonic acid of the gases into carbonic oxide by passing the gases down through a second bed of incandescent fuel, substantially as specified.

2. The method herein specified of making illuminating-gas, consisting in superheating steam by passing it through a superheater, then decomposing the steam into hydrogen, carbonic acid, and carbonic oxide by passing it down through a bed of incandescent fuel, passing such gases into a heated commingler, supplying into such commingler liquid hydrocarbon that is volatilized and commingles with the gases, then fixing the gases and converting any carbonic acid into carbonic oxide by passing the mingled products down through a second bed of incandescent fuel, substantially as set forth.

3. The combination, in a gas-making apparatus, of a vertical decomposer, a vertical commingler containing brick or similar material and a generator, and connecting flues from the bottom of the decomposer and the top of the generator, substantially as and for the purposes set forth.

4. The combination, in a gas-making apparatus, of a generator, a commingler, a decomposer, a superheater, the intermediate connecting-pipes, an escape-chimney and damper at the superheater, and a gas-delivery pipe at the generator, substantially as set forth.

Signed by us this 20th day of June, A. D. 1882.

H. M. PIERSON.
J. S. PIERSON.

Witnesses:
GEO. T. PINCKNEY,
HAROLD SERRELL.